May 13, 1941. K. D. KYSOR 2,241,606

TWO SPEED TRANSMISSION FOR AXLES

Filed March 7, 1939 2 Sheets-Sheet 1

INVENTOR.
Karl D. Kysor
BY Word & Word
ATTORNEYS

May 13, 1941.  K. D. KYSOR  2,241,606
TWO SPEED TRANSMISSION FOR AXLES
Filed March 7, 1939  2 Sheets-Sheet 2

INVENTOR.
Karl D. Kysor
BY
Wood & Wood
ATTORNEYS

Patented May 13, 1941

2,241,606

UNITED STATES PATENT OFFICE 2,241,606

TWO SPEED TRANSMISSION FOR AXLES

Karl D. Kysor, Northville, Mich., assignor of one-half to Charles Reedy, Cincinnati, Ohio Application March 7, 1939, Serial No. 260,361

5 Claims. (Cl. 74—326)

This invention relates to speed change gearing for use between the drive shaft and the rear axle of a motor vehicle. The primary purpose of this type of gearing arrangement is to provide two different speeds for the back axle relative to the speed of the drive shaft. The low speed of these two speeds provides a ratio the same as that ordinarily employed in all motor cars. In other words, the gearing, driving the drive shaft, is more or less standard and is adapted to drive the rear axle at a speed, proper in relation to the speeds obtained in the usual transmission.

The gear change transmission, which is standard, provides a speed arrangement which meets road conditions in the proper manner and provides that the engine will not be overloaded when the roads are in bad condition. As fully described heretofore, in other patents, it has been determined that the standard drive ratio is not efficient, in high gear, when favorable road conditions exist. For this reason, a shift to a higher speed has been provided in the past in which the ratio between the speed drive shaft and the rear axle is lower. Thus, a speed is provided which may be used when the roads are in good condition.

The constructions, employed in the past, for this purpose, using two ring gears and two pinions, have not been successful in operation, first, since the bearings employed have not been preloaded, second, the bearings have not been arranged so to prevent lateral movement or spreading of the gears, either axially or at right angles to the axis, third, it has not been possible to adjust the pinions together or independently for gear mesh, and fourth, the bearings have not been adjustable independently of the pinion and ring gear relationship.

It has been the object of the present inventor to provide an arrangement of the pinions wherein the supporting bearings are preloaded and further to prevent deflection of the pinions from a correct meshing position specifically deflective laterally from the axis of rotation or along the axis of rotation. This object has been accomplished with the result that the gears continue to operate quietly in both forward and reverse directions.

Additionally, it has been the object of the inventor to provide for adjustment of either pinion separately longtiudinally of the axis or in and out of mesh with the respective longitudinal gear without disturbing, in any respect, the corresponding adjustment of the other set of gears and also without changing the preloaded condition of the pinion bearings.

Furthermore, it has been the object of the present inventor to provide a construction wherein the amount of pinion bearing preloading may be increased or decreased without disturbing the respective axial adjustments of the pinions with respect to their particular ring gears.

All of the above objects have been achieved in a construction wherein the parts are reduced to a minimum and the bearings are located immediately adjacent the pinions and wherein each pinion is adjustable independently, with spaces afforded between the pinions and wherein the bearings are permanently set with respect to each pinion, so that either pinion or any bearing may be adjusted without disturbing the adjustment of any other bearing or pinion.

Other objects and certain advantages will be more fully apparent from a description of the accompanying drawings in which:

Figure 3 is a view looking at the rear of the back axle with the rear cover plate removed for illustrative purposes.

Figure 1:
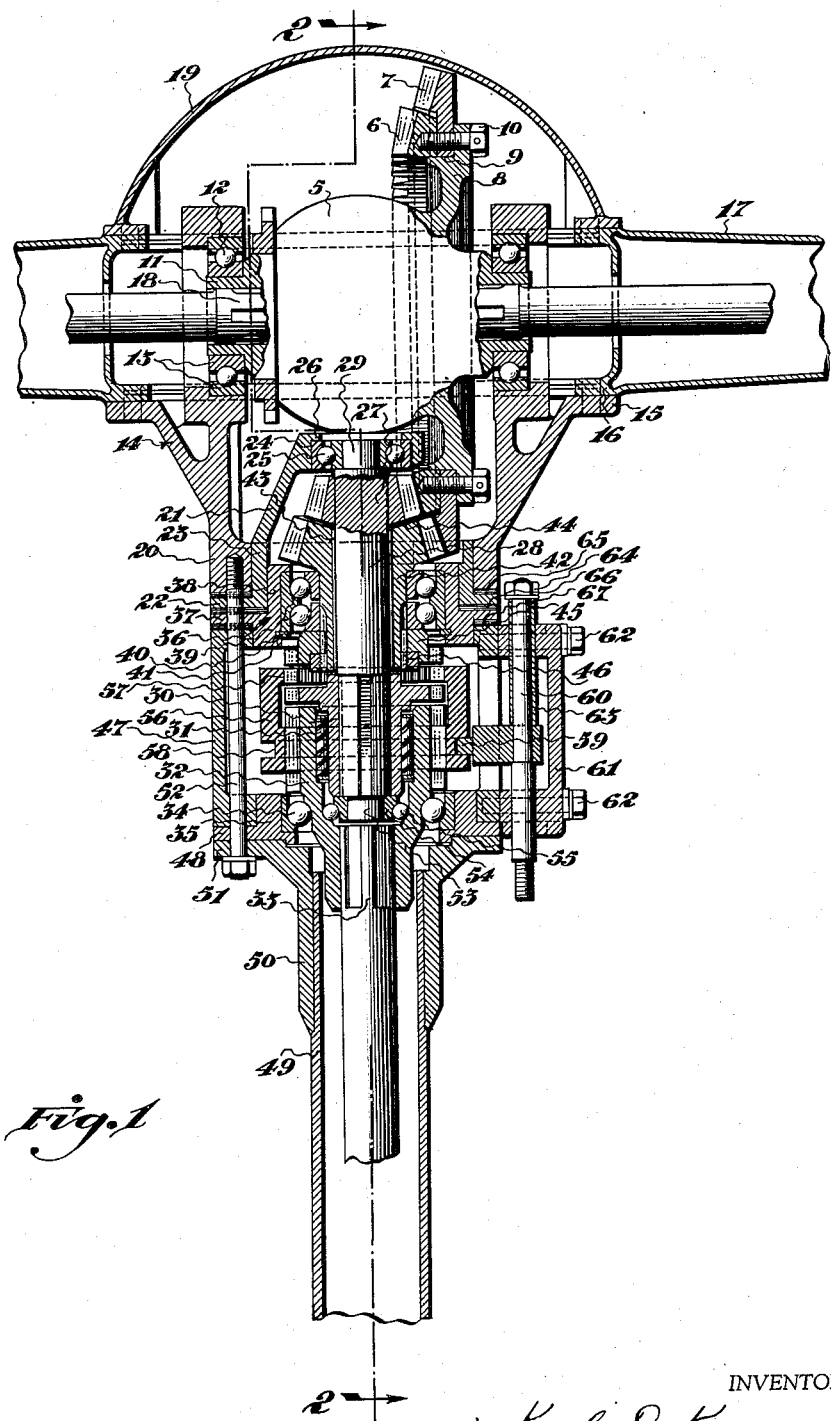
Figure 1 is a sectional view taken horizontally through the two speed axle construction of this invention.

The improvements, concerned herein, are applied at the rear end of the drive shaft where it connects to the differential for the drive axle of the vehicle. The differential is not shown in detail, since any conventional arrangement may be utilized. In fact, the internal construction is not illustrated, but only enough of a differential housing is shown to indicate the connection of the drive thereto.

The differential body is indicated at 5 and the ring gears 6 and 7, for low and high speed respectively, are attached thereto. For this purpose, the differential body includes a circular plate 8, formed integrally therewith. The ring gears 6 and 7 are superposed, one upon the other, and mounted in an annular groove 9 around the circular plate in which they are attached by means of screws 10 passing through both gears. The differential body 5 includes hubs 11, which are supported in ball bearings 12, carried in split bearing elements 13 of the differential housing 14, which generally houses the drive connection of the ring gears. This member 14 includes a circular flange 15 fixed to the circular central portion 16 of the back axle housing 17.

The sections 18 of the wheel driving axle have their inner ends in splined connection with the hubs of the differential member 5 and extend outwardly to the respective wheels (not shown). The outer housing or back cover 19 for the driving unit is fixed to the rear face of the circular portion 16 of the axle housing. The arrangement of parts, described heretofore, is of no particular moment in the present invention and is described merely for the purpose of showing an environment.

Now the forward or housing 14 of the differential, includes a forwardly projected sleeve portion 20 in which certain of the parts are nested. The first of these parts is a cone-shaped or tapered sleeve 21, which includes a circular flange 22 lying against the end face of the differential housing 14. This element 21 further includes a straight sleeve portion 23 disposed within the straight bore of the housing member and, from this point, rearwardly tapers to provide an inner bearing boss 24 at its inner end. Within this boss, a ball or taper roller bearing 25 is mounted. As shown, the outer race of the bearing is set within an annular recess in the boss and lies against an end flange 26.

The low speed pinion 27 is formed as an integral part of a short shaft section 28, the rear end of which includes a counterturned portion 29 supported in the inner race of the rear bearing. The forward end of this shaft is counterturned to provide a splined supported connection in a coupling sleeve 30, the coupling sleeve in turn being supported on long roller bearings 31 engaged around the inner side of a tubular drive coupling 32. This element receives the end of the drive shaft 33 in splined connection. Further, the drive coupling element 32 is supported and constitutes the inner race for ball bearings 34, the outer race of which is fixed in a counterbore of a bearing bracket or support plate 35.

An intermediate sleeve element 36 includes a flange 37, which is held against the flange of the rear bearing support sleeve 21 and includes a straight sleeve portion 38, nested or telescoped within the first named sleeve. A preloaded double row ball bearing 39 has its outer race held within this sleeve 36 in a counterbored portion thereof by means of a snap ring 40 lying within an annular retaining groove 41 adjacent the outer end of the bore. The inner race of the double ball bearing is split, for assembly purposes, or a one piece preloaded double row bearing may be used. The high speed pinion 42 is supported within the inner races. This arrangement leaves the amount of preloading to the bearing manufacturer.

Very fine roller bearings 43, commonly called needle bearings, are interposed between the supporting hub of the high speed pinion and the shaft section of the low speed pinion. Space indicated at 44 is maintained between the faces of the two pinions. The high speed pinion assembly includes a drive coupling clutch element 45, engaged over the splined outer end of the hub of the gear and against the inner races. A nut 46, threaded upon the end of the hub and countersunk in the clutch element, holds the clutch element against the inner races and draws the pinion against the rear face of the rear inner race. The teeth on this clutch element are spur teeth, the same in number, pitch diameter, pressure angle, and otherwise, corresponding to those on the clutch element 30 carried by the low speed pinion shaft. A third sleeve of elongated form 47 has its rear end engaged against the forward face of the flange 37 of the second sleeve 36 and nests over a hub portion of this sleeve. This elongated sleeve constitutes the support for the clutch shifting elements and also houses the clutch mechanism.

The forward end of the sleeve 47 engages the rear face of the flange 48 of the forward bearing bracket 35 and nests over the rearwardly extended hub portion thereof. The torque tube 49, which surrounds the propeller or drive shaft 33, carries a flanged sleeve 50, fixed to its outer end. The flange 51 of this sleeve lies against the forward face of the forward bearing bracket 35. Long screws 52 extend through all of the flanges of the elements mentioned, namely: the sleeve 50, the bearing bracket 35, sleeves 47, 36, 21, and are screwed into the differential housing 14. These long screws draw all the parts tightly together.

The forward end of the shaft section 28, which includes the low speed pinion, is counterturned, as at 53, and carries the inner race 54 for a series of ball bearings 55, arranged around the base of the drive shaft coupling sleeve. This drive coupling sleeve is tubular or splined and carries a shiftable coupling sleeve 56 thereon. This coupling sleeve includes an internal flange 57 having internal teeth, the same in diametral pitch, number, pressure angle and otherwise, corresponding to those of the clutch elements on the low speed gear assembly and the high speed gear assembly. This flange is disposed between the respective clutching elements so that movement in a rearward direction couples the drive to the high speed pinion and movement in the forward direction couples the drive to the low speed pinion.

The coupling element or clutch 56 includes an annular groove 58 and this groove is engaged by means of a yoke 59. The yoke is fixed to and carried by a shiftable rod 60, engaged through the walls of a laterally extended element 61 of the elongated sleeve. This extension is held in place by means of screws 62 and its walls are bored to receive the shifter rod. The shifter rod 60 is counterturned to provide a shoulder against which the yoke is abutted. The yoke element is held against the shoulder by means of an elongated sleeve 63 engaged by a nut 64 on the rear end of the rod. The connection of the shifter rod to the drive compartment of the car is not shown and may be of any conventional design, including electrical or vacuum, or pressure shifting devices in connection thereto.

Shims 65 or a series of very thin washers are provided between the flange element 21 and the differential housing. By varying the number of shims used here, the relationship of the meshing teeth of the low speed pinion and ring gear may be varied. Changes in the spacing here move the pinions unitarily inwardly or outwardly.

Now, if it is desired to adjust the high speed pinion differently, the element 36 may be adjusted relative to the element 21 by varying the number of shims 66 used between these elements. In this manner, the high speed pinion is moved relative to the low speed pinion and is adjusted relative to the high speed ring gear. This adjustment, will, in no way, effect the adjustment of the low speed pinion.

It will be noted that the high speed assembly is movable unitarily relative to the element 36 and the bearings are preloaded. The thrust on the high speed pinion is efficiently absorbed, since the pinion is immediately adjacent the double row bearing. Any looseness, developing in the double bearing, may be taken up by adjusting the nut 46. Any looseness, developing in the bearings 34 and 54, supporting the low speed pinion and shaft section, may be taken up by varying the number of fine washers or shims 67, located between the elongated sleeve 47 and the sleeves 36. The long screws 52 are used for drawing the parts together and the bearing adjustment. This adjustment will take care of either set of rear ball bearings, namely 34 and 55.

This arrangement of parts is unusually compact and the space required is very little more than that required for the normal power shaft coupling to the differential. The support for either pinion is immediately adjacent thereto and, due to the axial support of the low speed pinion shaft section within the high speed gear pinion shaft section within the high speed gear and the double support bearing, there is no opportunity for lateral springing of the shaft or deflection of the driving pinions. Both pinions are mounted between the bearings which ultimately carry their reactions and no condition of overhung loading exists. Furthermore, the section modulus of the supporting shafts is extremely high in relation to their length and distance between the bearings. The load reaction moment arm lengths are very short and the path of the resultant loads always lays between the bearings.

Figure 2:
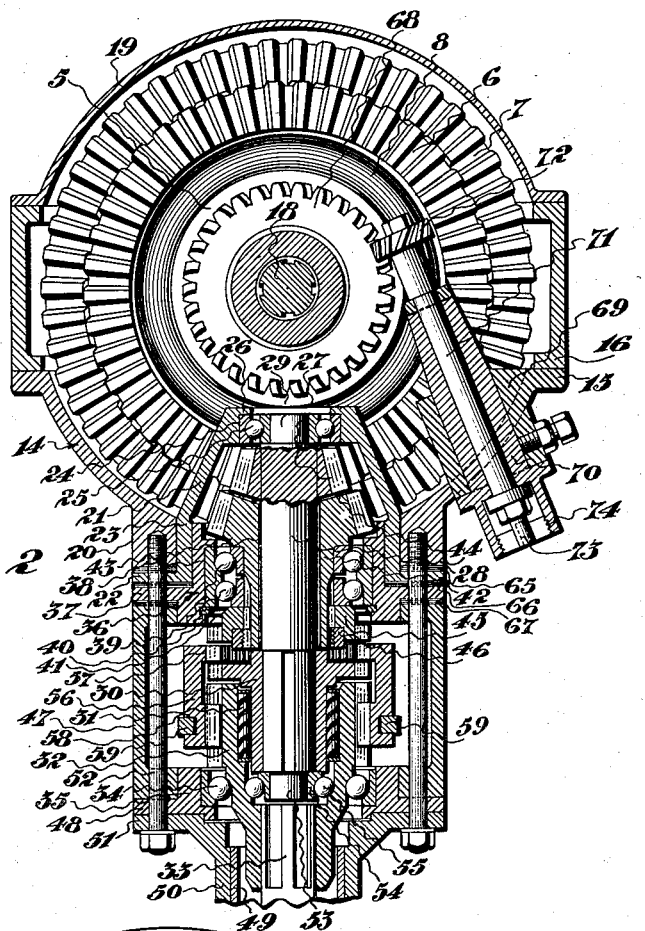
Figure 2 is a sectional view taken on line 2—2, Figure 1, further illustrating the structure.
Figure 5:
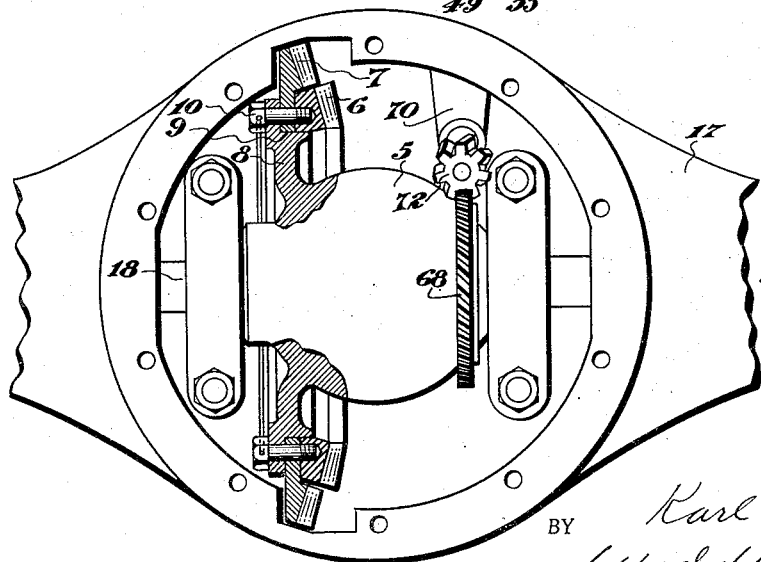

In view of the speed change between the drive shaft and the back axle, the drive for the speedometer is taken directly from the back axle. By locating the speedometer drive in this manner, the speed variations, occurring because of gear shifts, are eliminated. For this purpose, spiral gear 68 is fixed to the differential element 5. As shown in Figure 2, the differential housing is provided with a boss 69. A sleeve 70 is fixed in this boss and projects toward the gear 68. This sleeve is fixed in position by means of a set screw. A shaft 71 is journalled in the sleeve and carries a bevel gear 72 on its inner end, meshing with the gear 68. The outer end of the shaft includes a socket 73 to which the speedometer driving connection is made. The sleeve includes an internal screw-threaded coupling end, fixing the speedometer driving connection in position.

Having described my invention, I claim:

1. In a two speed transmission for motor vehicles, a drive shaft, a rear axle, a housing for said axle including a central portion providing a circular flange, a bearing support element having a circular flange engageable with the first mentioned flange, a second bearing bracket having a circular flange engageable with said circular flange of said first bearing bracket, coaxial ring gears for driving said rear axle, a pinion for each ring gear, one of said pinions supported in each bearing bracket and means for securing said bearing brackets on said housing.

2. A two speed gear change transmission for motor vehicles including the drive shaft and back axle of the motor vehicle; a housing for the back axle, bearing brackets supported upon said housing, coaxially of said drive shaft, a high speed pinion supported in one of said bearing brackets, a low speed pinion supported in the other of said brackets, ring gears connected to the back axle and in mesh with the respective pinions, spacing means between the brackets and the axle housing, and means for fixing said brackets and housing together.

3. In a two speed transmission for connecting the drive shaft of a motor vehicle to the respective ring gears of the rear axle thereof, including the drive shaft, rear axle, and ring gears, an axle housing, a low speed pinion, a rear bearing bracket for said low speed pinion, bearing means for the forward end of said low speed pinion, a forward bearing bracket for said bearing means, a high speed pinion journalled on the axis of rotation of said low speed pinion, an intermediate bearing bracket for supporting said high speed pinion, means for adjusting said high speed pinion in said bearing bracket, means for spacing said brackets relative to each other and relative to said axle housing, and means for attaching the brackets to the axle housing for disposing the gears in driving relationship to said ring gears.

4. In a two speed transmission for connecting the drive shaft of a motor vehicle to the respective ring gears of the rear axle thereof, including the drive shaft, rear axle, and ring gears, and axle housing, a low speed pinion, a rear bearing bracket for said pinion, bearing means for the forward end of said low speed pinion, a forward bearing bracket for said bearing means, a high speed pinion journalled on the axis of rotation of said low speed pinion, an intermediate bearing bracket for supporting said high speed pinion, and means for attaching the brackets to the axle housing for disposing the gears in driving relationship to said ring gears.

5. In a two speed gear change transmission adapted to be interposed between the drive shaft and the back axle of an automobile, a supporting housing for the back axle, three telescopically engaged bearing brackets each including a circular flange said flanges adjacently disposed and engaged against a circular flange of the supporting housing, a low speed pinion shaft journalled in the outer of said bearing brackets and providing a pinion at one end adjacent one of said bearing brackets, a high speed pinion assembly journalled in the intermediate bracket about said low speed pinion shaft, roller bearings disposed between said high speed pinion and said low speed pinion shaft and, means whereby the spacing of the three bearing brackets may be adjusted relative to each other and to the supporting housing.

KARL D. KYSOR.